(No Model.)  5 Sheets—Sheet 1.

J. A. STONE.
CORN CUTTER AND BINDER.

No. 580,908.  Patented Apr. 20, 1897.

Witnesses
Arthur Johnson
J. T. Tracy

Inventor
John A. Stone
By his Atty
J. F. Steward

THE NORRIS PETERS CO., PHOTO-LITHO., WASHINGTON, D. C.

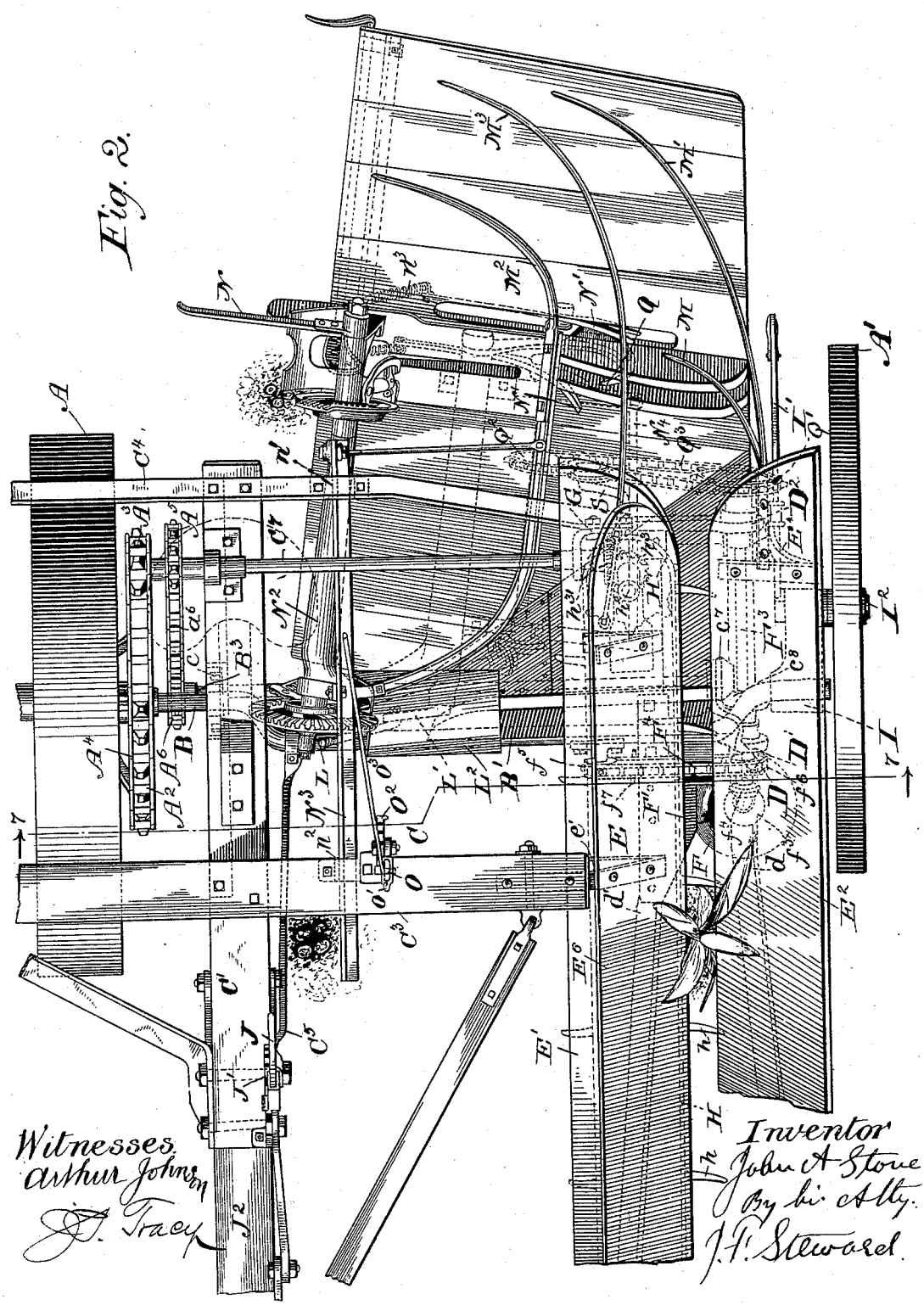

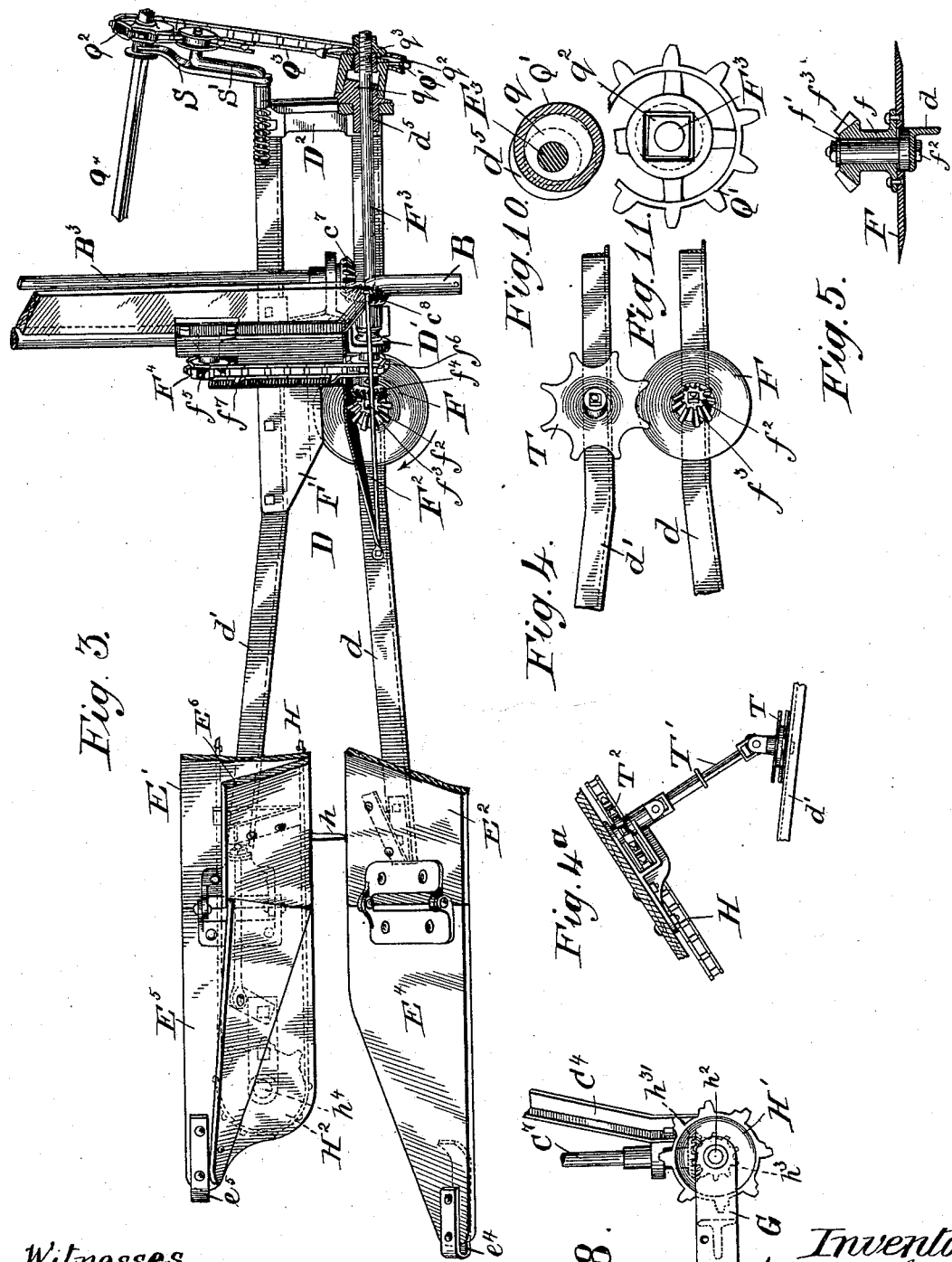
(No Model.) 5 Sheets—Sheet 3.
J. A. STONE.
CORN CUTTER AND BINDER.
No. 580,908. Patented Apr. 20, 1897.

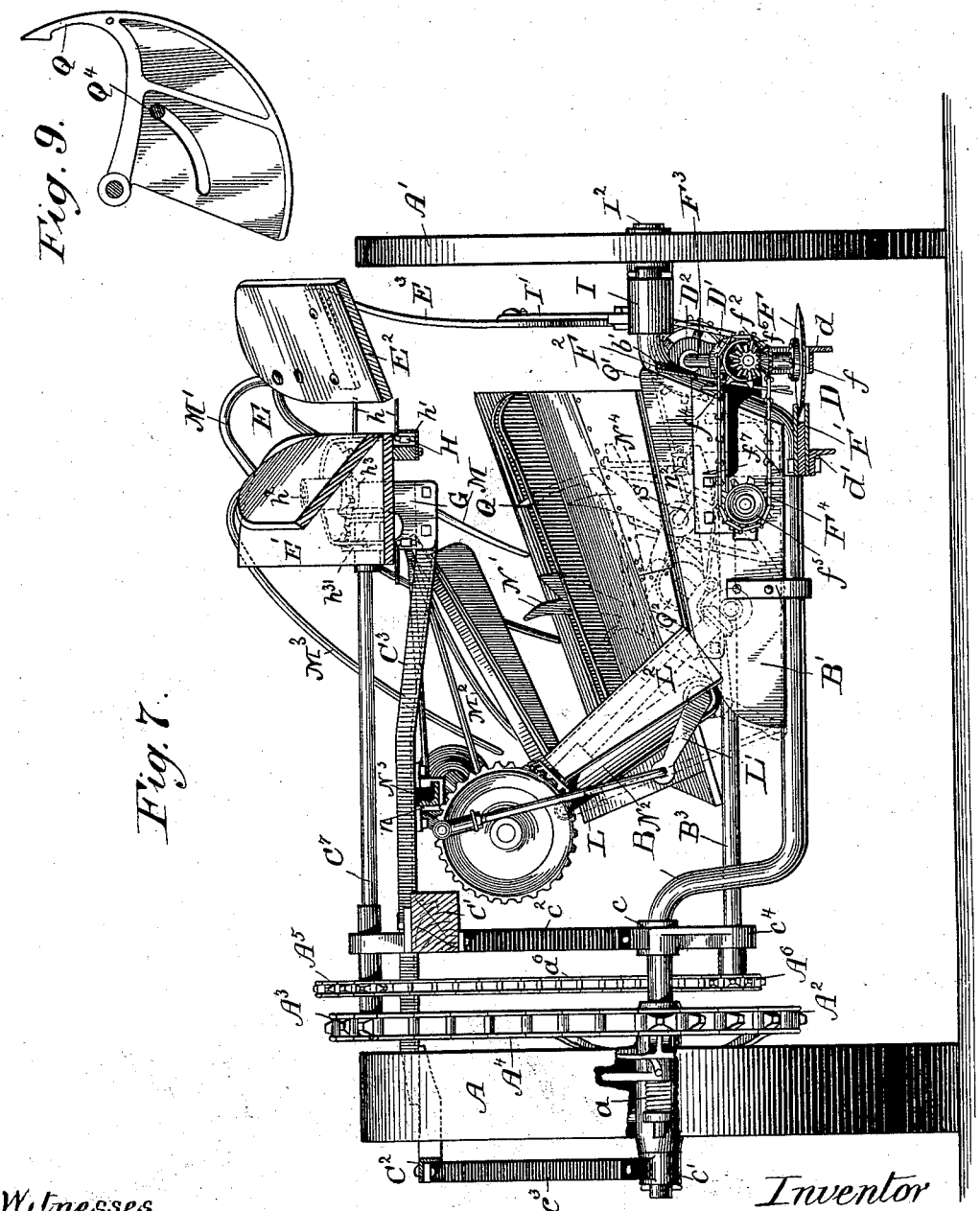

UNITED STATES PATENT OFFICE.

JOHN A. STONE, OF CHICAGO, ILLINOIS, ASSIGNOR TO THE DEERING HARVESTER COMPANY, OF SAME PLACE.

CORN CUTTER AND BINDER.

SPECIFICATION forming part of Letters Patent No. 580,908, dated April 20, 1897.

Application filed June 28, 1894. Serial No. 515,957. (No model.)

*To all whom it may concern:*

Be it known that I, JOHN A. STONE, of Chicago, in the county of Cook and State of Illinois, have invented certain new and useful Improvements in Corn Cutters and Binders, of which the following is a full description, reference being had to the accompanying drawings, in which—

Figure 1:
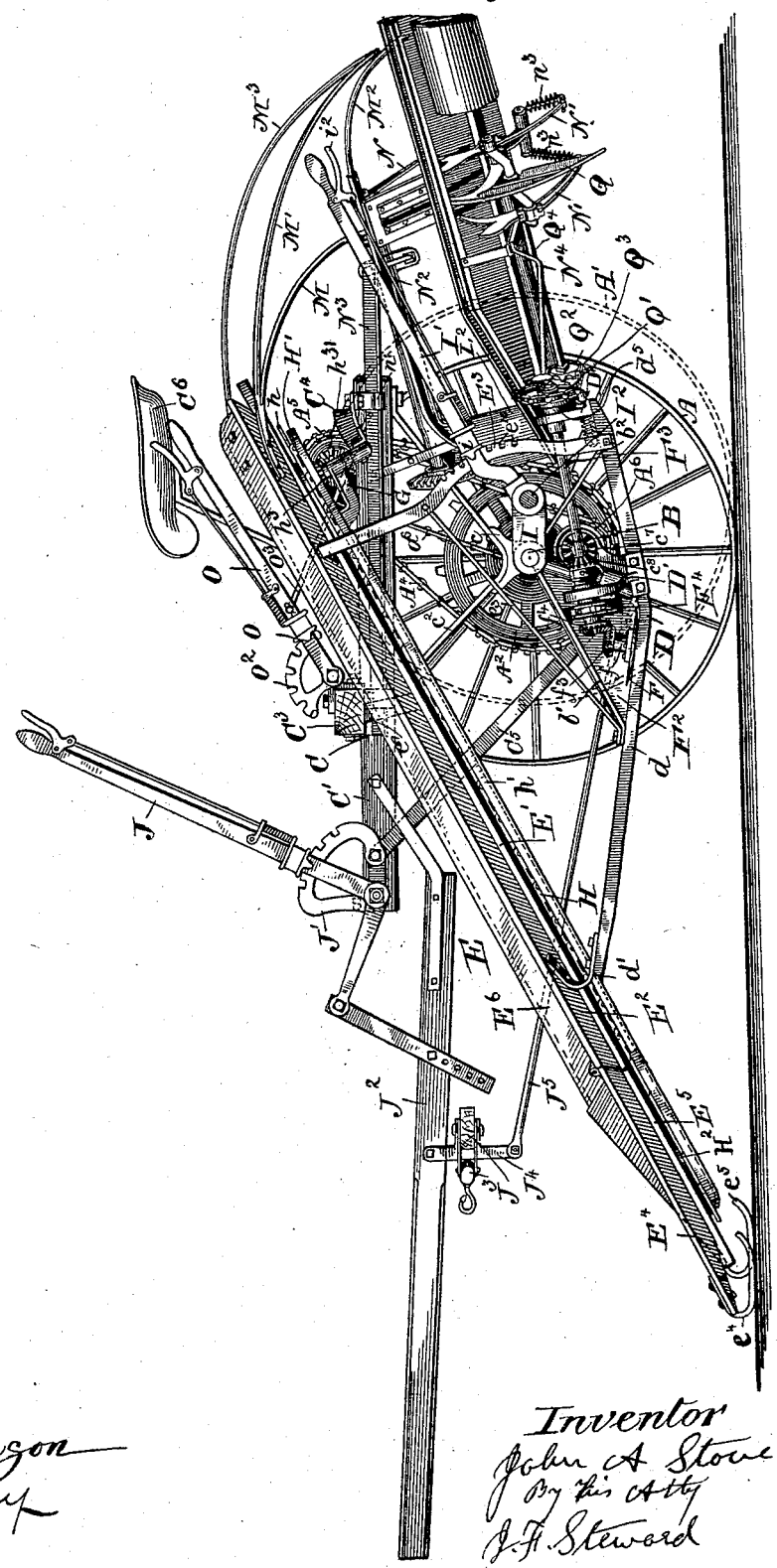
Figure 6:
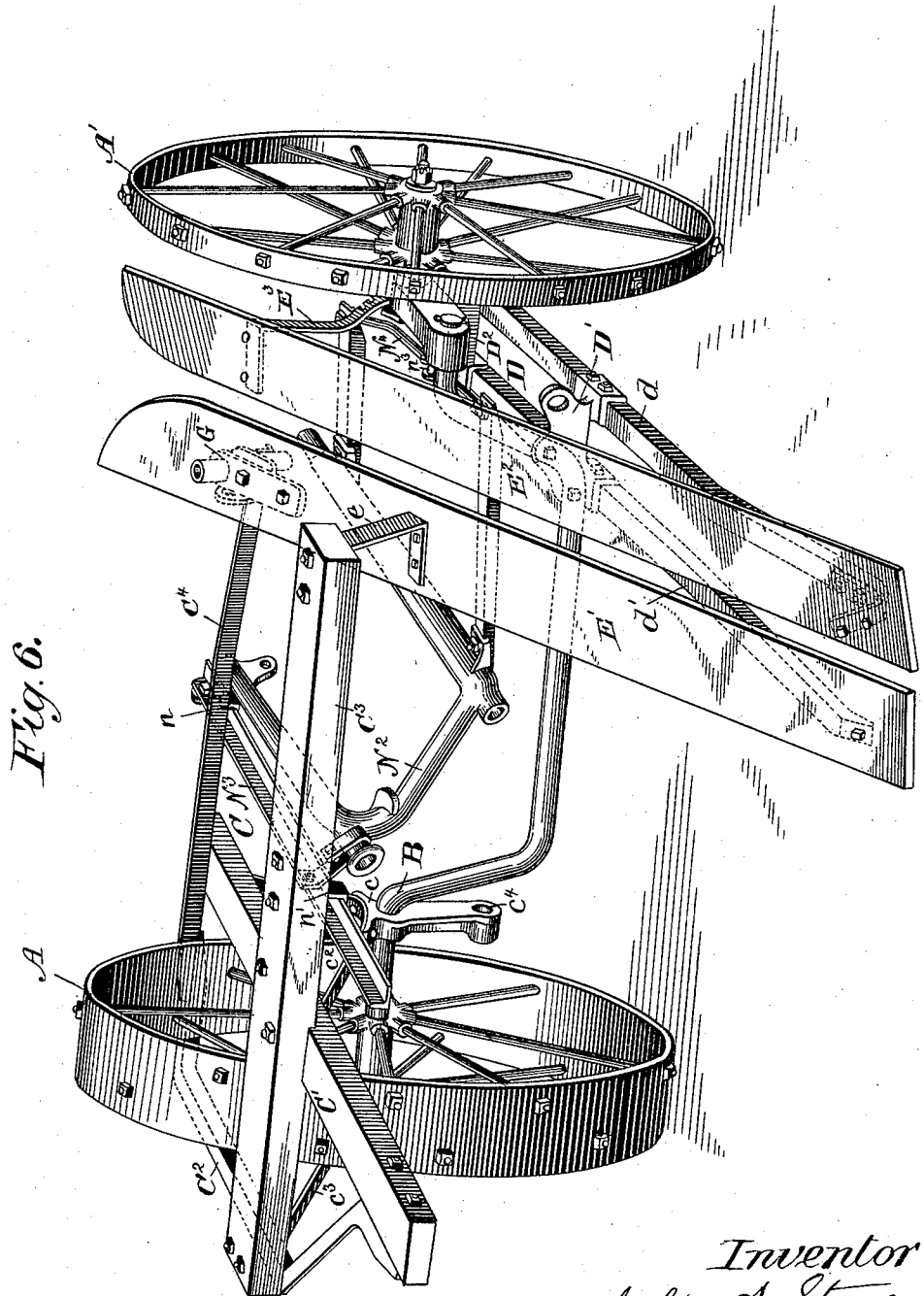

Figure 1 is a side elevation, the corn-side wheel being indicated in dotted lines for the purpose of making the drawing clear. Fig. 2 is a plan view. Fig. 3 is a plan view of the cutting apparatus, the forward end of the gathering mechanism, and other details. Figs. 4 and 4$^a$ are detail views showing modified forms of the cutting apparatus. Fig. 5 is a central cross-section of the knife. Fig. 6 is a perspective view of the framework only. Fig. 7 is a sectional elevation on the line 7 7 of Fig. 2 in the direction of the arrows. Fig. 8 is a detail showing part of the gatherer-driving mechanism. Fig. 9 is a side elevation of the needle. Figs. 10 and 11 are details showing parts of the binder-driving mechanism.

The object of my invention is to provide a machine that shall cut the standing corn and bind it into bundles preparatory to shocking.

It consists in devices whereby the corn, while it is being gathered, is tipped rearwardly, falls directly upon a binding-table, along which it is forced, preferably by the action of gravity, out of the way of the succeeding stalks, and is bound and discharged onto the ground. For the purpose of operating upon the corn in what seems to me a perfect manner the binding attachment is placed upon the harvester so that what may be considered a primary receptacle, wherein the corn last cut accumulates during the operation of binding the previously-formed gavel, is made possible. The primary receptacle is formed by a combination of side limits, which guide the upper half of the stalks down onto the binder-table, and the said binder-table with the concentric portion of the band-carrying arm of the binding attachment. The automatic binder may be of any of the well-known kinds that are used on grain-harvesters, when modified in a manner hereinafter to be described.

To suit various lengths of the cut stalks of corn the binder attachment is made capable of adjustment fore and aft, but as it would be difficult to make the overreaching arms of a binding attachment so long as to bind the stalks centrally I so provide that the butts of the stalks may extend forward of the connecting portion of the U-shaped binder-frame and approximate central binding of various lengths of corn by sufficient adjustment fore and aft. With that end in view I have bent the axle downward for the purpose of leaving an open space forward of said axle and between the cutting apparatus and the vertical portion of the frame of the binding attachment in which the butts of the stalks accumulate.

The binder attachment is hung at an angle to the line of advance of the machine for the purpose of depositing the bundle when bound upon the ridge of the preceding row for two purposes—one to deposit the said bundle relative to the rows of corn so that should the operator cut out a "land" in a field of corn and then turn round and cut back along the row previously cut (leaving the row which he had previously and necessarily driven over uncut) the team would straddle the row, and hence the discharged bundles, and, second, with the binder so placed relative to the harvester the bundle will be deposited upon the ridge of the row previously cut, and should the frequent autumn rains occur between the operation of binding and shocking the bound bundles will lie upon the main level of the ground and thus be kept dry.

My machine is capable of being used in listed and planted corn and is designed to cut one row at a time.

In the drawings, which represent my invention in the most preferable form, A is the drive-wheel, and A' is the corn-side wheel. These wheels are supported upon an axle B, a portion of which is bent downward out of the way of the butts of the cut stalks. To the corn-row end of the bent portion of the said axle is secured the frame D, which supports the cutting apparatus.

C is the main frame of the machine, consisting of trussed sills C' and C$^2$, parallel to the line of advance of the machine, and sills C$^3$ and C$^4$, parallel to the axle and extending toward the row of corn to be operated upon, over the binding-receptacle, to support the main portion of the gathering mechanism. The trussed sills C' and C² are supported directly upon the axle B by bearings $c$ and $c'$, secured to the bent bars $c^2$ and $c^3$, which form the lower members of each truss.

C⁵ is a brace extending from the forward end of the sill C' down to the bent portion of the axle B.

C⁶ is the driver's seat, its spring being placed conveniently upon the sill C'.

D is the frame of the cutting apparatus and consists of bars $d$ and $d'$, running fore and aft on each side of the corn-row, and of bridge-pieces D' and D², to which the said bars are secured. The bridge-piece D' is situated to the rear of the cutting apparatus and has a seat formed thereon which conforms with the shape of the bent portion of the axle and is bolted thereto. Braces $b'$ and $b^2$ serve to render the frame D rigid with the said axle.

The cutting apparatus (best shown in Fig. 3) consists of a rotary disk F, its outer edge running within a stationary guard F'. The disk F has a hub $f$ and is supported upon the member $d$ of the frame D, so as to revolve loosely around a thimble $f'$, bolted to the part $d$ by a bolt $f^2$. The hub has on its upper end, and preferably cast integral therewith, a bevel-gear $f^3$. The guard F', as shown in Figs. 3 and 7, consists, as preferably made, of three plates bolted together and is secured upon the member $d'$ of the frame D. This guard presents a beveled edge to the corn, so as to guide it to the knife.

F² is a shield protecting the gearing that drives the cutting apparatus.

The knife receives its motion from the drive-wheel A in the following manner:

A² is a sprocket-wheel revolving loosely upon the axle B and adapted to engage positively with the hub of the main wheel A by means of a clutch $a$, which may be of any of the well-known kinds, and hence needs no further description.

C⁷ is a counter-shaft journaled in the frame C and having on its stubbleward end a sprocket-wheel A³. Over the sprocket-wheels A² and A³ is thrown a chain A⁴. A⁵ is a sprocket-wheel secured to the shaft C⁷.

B³ is a second counter-shaft having journal-bearings, one in an extension $c^4$ of the bearing $c$ and the other in the casting D'. To its stubbleward end is keyed or otherwise secured a sprocket-wheel A⁶. A chain $a^6$ is thrown around the sprocket-wheels A⁵ and A⁶. At the corn-row end of the shaft B³ is a bevel-gear $c^7$, which meshes with another bevel-gear $c^8$, secured in any preferable way to a shaft F³, which shaft has journal-bearings near its extremes in the castings D' and D². At the forward end of the said shaft F³ is a bevel-gear $f^4$, which meshes into the bevel-gear $f^3$ upon the hub of the rotary knife, thus driving it in the direction of the arrow shown in Fig. 3. Directly behind and above the knife is a chain F⁴, which is thrown over a pair of small sprocket-wheels $f^5$ and $f^6$, the latter being shown as cast integral with the bevel-gear $f^4$. Upon the said chain are teeth $f^7$, the purpose being to keep the cutting apparatus from weeds or trash which accumulate behind it and to throw the butts of the corn stubbleward.

The gathering apparatus E is situated immediately above the frame of the cutting apparatus and declines forward in the direction of advance.

E' is a board secured at its lower end to the member $d'$ of the cutting-apparatus frame D and at its upper end to a casting G, which casting forms the corn-row-side termination of the rear overreaching sill C⁴ of the frame C. $e'$ is a strut securing the said board E' to the corn-row end of the front overreaching sill C³ of the frame C. A second board E² is secured at its lower forward end to the member $d$ of the frame D and at its upper end to an upright post E³, the lower end of which post is bolted to the rear end of the frame D. $e^3$ is a brace running from the post E³ forward to the frame D. These boards E' and E² are in such a position relative to each other as to form a slot through which the corn is gathered and bent over to be cut and dropped upon the binding-table. Hinged to the boards E' and E² at their forward ends are extensions E⁴ and E⁵. These extensions are provided with shoes $e^4$ and $e^5$, and the purpose of said hinged extensions is to adapt them to travel freely over uneven ground, it being necessary that they should be as low as possible when the machine is tilted in order to pick up broken and wind-blown stalks. The corn is gathered through the slot formed by the two boards E' and E² by means of a chain H, having picker-teeth $h$ of any well-known kind. $h'$ is a light angle-iron which supports the aggressive side of the said chain. This chain is thrown around sprocket-wheels H' and H², situated at the extremes of the gathering mechanism, and is driven along the slot in a rearward direction. It is speeded a little faster than the machine, so as to tip the stalks rearward sufficiently to allow them to fall naturally upon the binding-table. If necessary or desirable, a similar chain may be supported upon the board E² in a similar way, but after experimenting I have found that one chain is sufficient, and I prefer to situate that chain on the stubbleward side of the gathering-slot in order to operate it in a suitable and simple manner. The sprocket-wheel H' is journaled upon a spindle $h^2$, placed at right angles to the board E' and journaled in the casting G, which, as before mentioned, forms the termination of the overreaching sill C⁴.

$h^3$ is a bevel-gear, preferably cast integral with the sprocket-wheel H', which meshes with a bevel-gear $h^{31}$, secured to the corn-row end of the shaft C⁷. The sprocket-wheel H² is journaled loosely upon a stud $h^4$, suitably secured to the extension E⁵. For the purpose of providing for the necessary free movement of the said extension $E^5$ upon the ground I use a chain having double joints similar to the kinds shown in my Patents Nos. 393,490, 393,491, and 470,718. The board $E^2$ is inclined cornward from the slot, and a supplementary inclined board $E^6$ is placed upon the board $E'$ for the pupose of forming a trough in which the ears may travel while the stalks are being gathered without danger of their being snapped from the said stalks.

It is desirable to raise and lower the cutting apparatus to suit the conditions of corn, and that part with the gathering apparatus only need be so adjusted. For that purpose there is placed upon the corn-row end of the bent axle D an arm I, adapted to turn loosely around the said axle as a center. This arm extends rearwardly and forms a part of, when mechanically considered, a lever $I'$. A portion of the standard $E^3$ being approximate to the lever $I'$ is bent in the form of a quadrant and has notches $e^{10}$ cut therein, in which a latch $i$, situated upon the lever $I'$, engages. In the arm I is secured a stud $I^2$, which forms the support for the machine in the hub of the corn-row wheel $A'$. The latch $i'$ is adapted, by means of the finger-lever $i^2$, of the usual kind, to be disengaged from the quadrant for the purpose of raising and lowering the cutting apparatus and the corn-row side of the machine.

When corn that has been blown down has to be harvested, it is necessary that the forward end of the machine shall be tilted so that the extensions of the gathering apparatus above described shall be substantially horizontal, in order to pick up the "down" stalks. For that purpose a tilting apparatus consisting of a lever J, within reach of the driver, a quadrant $J'$, and mechanism for connecting said lever to the draft-tongue $J^2$ is provided. This tilting apparatus may be of any of the well-known forms.

$J^3$ are the whiffletrees attached to the tongue by means of a pendant $J^4$, to the lower end of which is secured a draft-rod $J^5$. This draft-rod connects to the bent portion of the axle D and serves to relieve the frame C of part of the strain due to the draft of the machine.

The binder attachment is situated at the rear of the axle and between the gathering apparatus and the main wheel A, and inclines toward the rear for the purpose of raising the needle and packers to a safe distance above the ground. The binder, as shown in the drawings, is one of the kind known as the "Deering," as distinguished from other forms of the Appleby type of binder, and its peculiarities consist, mainly, in the method of driving the various shafts, which method consists in the use of bevel-gears in lieu of spur-gears or chain. While any of the kinds may be used, I prefer this particular type of binder because the driving-gear takes up little space and therefore leaves more space for the butts of the cut stalks, particularly those of high corn. In order to provide as much space for the butts as possible, I arrange the pitman L so that it pushes the needle through its motion instead of pulling it, as it ordinarily does, and this enables me to place the needle-crank $L'$ on the stubbleward side of the binder-frame, as seen in Fig. 7, where the lowest position of the needle-crank is shown in dotted lines.

I place a shield $L^2$ over the gearing and around the vertical portion of the main frame, which shield forms a wall which arrests the stubbleward movement of the butts of the stalks down the declined binder-table and past which they slide when the bundle is being discharged. By referring to Fig. 2 it will be understood that when the bundle is ejected by the arm N the rearward portion only falls immediately to the ground and draws the butt or forward portion of the bundle off as the machine advances. To guide the heads of the corn from the gathering apparatus to the binder-table, I provide upon the corn side guides M and $M'$, which are more or less elastic, and upon the stubbleward side guides $M^2$ and $M^3$. These two series of guiding-rods should be considered as side limits of a passage-way from the gathering-slot to the binder-table.

$B'$ is a board secured to the bent portion of the axle B, on the edge of which the butts of the cut stalks rest. In the continued movement rearward of the upper portion of the stalks along the gathering-slot and down the passage-way to the binder-table the butts will rest upon the upper edge of the board $B'$ and be moved stubbleward by the chain $F^4$ until the stalks reach the binder-table, at which time, owing to the action of gravity, the stalks will be forced along the deck stubbleward to the packers N of the binder attachment. The binder-frame $N^2$ is secured to a bar $N^3$, which is supported upon the main frame C in brackets $N'$ and $N^2$, and it is further supported at its corn-row side upon a bar $N^4$, having a support $n^3$ in the frame D. The brackets in the frame $n'$, $n^2$, and $n^3$ are such as to allow the said bars carrying the binder to be slid fore and aft for the purpose of securing central binding. In order to adjust the machine for that purpose, a lever O is provided, pivoted upon the main frame and having a latch $O'$, adapted to engage a toothed quadrant $O^2$.

$O^3$ is a rod running from the lever O to the bar $N^3$.

The needle Q of the binder attachment is of the kind used in grain-binders, but differs in one respect in that it is provided with a solid web, (best shown in Fig. 9,) and having in the said web a slot through which the packer-shaft $Q^4$ passes. The purpose of this solid web is that when the needle is in its uppermost position during the operation of binding there will be no liability of the incoming stalks or ears of corn to be pushed between its various parts and cause the binder to choke upon the retrograde movement of the said needle. It will be observed that a primary receptacle for the incoming stalks when the previously-formed gavel is being bound is formed by the circular portion of the needle, the curved rods $M^2$ and $M^3$ on one side, and by the curved rods M and M' on the other side.

As before described, the shafts of the binder do not lie parallel with the shafts of the harvester, and in order to drive the packer-shaft $Q^4$ (which is the motor-shaft of the binder) with a chain the binder-driving sprocket-wheel Q', situated at the rear end of the shaft $F^3$, is driven by that shaft as follows: $q$ is an eccentric cast upon the journal-box $d^5$, and $q^2$ is a square collar secured to the shaft $F^3$, and may be considered a part of the said shaft. $q^3$ is a nut which holds the wheel Q' from slipping off the said shaft. The sprocket-wheel Q' has a hub the forward end of which fits onto the fixed eccentric $q$, and in the rearward end of the said hub is a square aperture adapted to engage the collar $q^2$. The eccentric $q$ has sufficient eccentricity to throw the axis of the sprocket-wheel Q' parallel with that of the packer-shaft $Q^4$. The square collar $q^2$ serves to give it rotation.

$Q^2$ is the packer-shaft sprocket-wheel, mounted loosely upon the packer-shaft $Q^4$, which, as shown in Fig. 3, is square in cross-section. The said wheel $Q^2$ is held in its proper position relative to the wheel Q' by the arm S, that engages a groove upon the hub of the said sprocket. When the binder is adjusted fore and aft, the length of the chain $Q^3$ will be varied, and in order to take up that difference in length a spring chain-tightener S' is provided. It will be seen that the shaft $F^3$ could be mounted so as to be parallel with the packer-shaft of the binder, but in order to secure a compact construction I prefer this method of driving the said binder attachment. To provide a feed to the rotary knife that shall be better adapted to the cutting of down stalks, the guard F' may be modified as shown in Figs. 4 and $4^a$.

T is a double rotary disk, the two parts of which are adapted to form a guard through which the knife rotates, and the said rotary guard is scalloped in order to feed and hold the stalks to the knife. If desirable, the said rotary guard may be given a positive motion, so as to make it a forced feed to the rotary knife, by a knuckle-jointed shaft T', extending upward to the under side of the board E', where the said shaft could be conveniently journaled, and a sprocket-wheel $T^2$, adapted to be driven by the chain H, may be attached thereto, or the rotary guard may be driven by any other well-known and competent means.

The packer-links $n^3$ are made elastic in regard to their length for the purpose of providing means whereby the orbit of the packers would be varied should an unusually large amount of corn be fed to the binder. This is done in order to relieve the above-mentioned parts from undue strain.

It will be seen that by the peculiar construction I am enabled to gather the stalks and let them fall and move sideward and deliver them over the row previously cut, so that if it is desired to operate the machine while cutting back and forth on adjacent rows such may be accomplished by the team straddling the row previously bound. It will be further noticed that the member $L^2$ of the automatic binder-frame, whatever the position of the binding device, is not far from directly over the axle B, and hence that, although the stalks project forward and the tops are swung sideward slightly in discharging, the butts will with slight forward movement of the machine be drawn out of the way of the incoming gavel. I place my binding attachment somewhat diagonally, so that the heads may have free discharge and the bundles fall as nearly as may be on the previously-cut row. Placing the binder diagonally in this manner, as the attachment is moved, the shaft, sliding through the sprocket-wheel Q, tends to lengthen or shorten the chain $Q^3$. In order that the wheel may be properly guided, I provide the arm S and support it for convenience upon the shaft of the arm S', as will be seen in Fig. 3.

What I claim as my invention, and desire to secure by Letters Patent, is—

1. In a corn cutter and binder in combination with the carrying-wheels and a bent axle of a main gearing-frame supported upon said axle and adjacent to the driving-wheel, a cutter-supporting frame secured to said axle and adjacent to the idle supporting-wheel, the gathering apparatus situated above the said cutter-frame, the stubble side of which is supported by outreaching arms from the said main gearing-frame and the uncut-corn side of which is supported by an upreaching arm from the said cutter-frame, a binder-frame suspended between the two said frames and behind the said axle substantially as described.

2. In a corn cutter and binder in combination with the carrying-wheels and a bent axle of a main gearing-frame supported upon said axle and adjacent to the driving-wheel, a cutter-supporting frame secured to said axle and adjacent to the idle supporting-wheel, the gathering apparatus situated above the said cutter-frame, the stubble side of which is supported by outreaching arms from the said main gearing-frame and the uncut-corn side of which is supported by an upreaching arm from the said cutter-frame, a binder-frame adjustably suspended between the two said frames and behind the said axle substantially as described.

3. A main gearing-frame a binding attachment suspended therefrom, a guiding-slot through which the stalks are gathered, said guiding-slot adapted to cause the stalks to fall upon the upper primary receiving portion of the binding-table, a support for the butts of the stalks, down which they may slide as the stalks are carried to the secondary or binder receptacle proper at the lower end of the binder-deck, substantially as described.

4. In a corn harvester and binder the backwardly-inclining gathering devices having a space for butt travel of the stalks, a binding attachment, its table having an upper receiving position for the stalks as they fall, a cut-off to check the movement of the stalks down said table while the previous bundle is being bound, a support for the butts of the stalks along which they may move beneath the gathering devices, and upon which they may be sustained while in the secondary or binder receiver proper while being bound, all combined, substantially as described.

5. In a corn harvester and binder, a gathering device forming a guideway along which the stalks to be cut are moved, a cutting apparatus located therebeneath, gathering-chains adapted to lean the gathering stalks rearward, guides to direct the fall of said stalks extending beyond the said gathering apparatus, a binding-receptacle, an automatic binder, a binder-table sloping in a stubbleward direction directly behind the said cutting apparatus and adapted to permit the stalks, when received, to move along it, into position for being bound, packing mechanism adapted to force the stalks down the said binder-table into the automatic binder, and the endless toothed chain beneath the position of travel of the said butts for supporting and carrying them deliveryward in unison with the said packing devices, substantially as described.

6. In a corn cutter and binder, cutting apparatus and corn-gathering apparatus adapted to permit the stalks to move backward and fall upon the binder-table, said binder-table having an upper receiving position for stalks and a lower position to which they are moved in the direction that gravity aids to be bound, and said gathering device having a free space beneath it whereby the butts of the fallen stalks may be moved toward the secondary binder-receptacle, all combined, substantially as described.

7. In a corn cutter and binder, cutting apparatus and corn-gathering apparatus adapted to permit the stalks to move backward and fall upon the binder-table, said binder-table so sloped that the butts of the stalks may slide thereon from the receiving to the binding position, and said gathering device having a free space beneath it whereby the butts of the fallen stalks may move toward the secondary binder-receptacle, all combined, substantially as described.

8. In a corn cutter and binder, cutting apparatus and corn-gathering apparatus adapted to permit the stalks to move backward and fall upon the binder-table, said binder-table so sloped that the butts of the stalks may slide thereon from the receiving to the binding position, said gathering device having a free space beneath it whereby the butts of the fallen stalks may move toward the secondary binder-receptacle, packing mechanism and butt-moving mechanism lying beneath the butts of the stalks, all combined substantially as described.

9. The combination of the cutting apparatus, the row-gathering and stalk-guiding devices, the binding-receptacle having two positions for the stalks, one that of receiving them and the other that in which they are bound, a space provided beneath the gathering device whereby the butts of the stalks may move sideward, a butt-arrester to sustain them while being bound and from which the discharged bundle may be withdrawn, substantially as described.

10. In a corn cutter and binder in combination with the carrying-wheels and a bent axle of a main gearing-frame supported upon said axle and adjacent to the driving-wheel, a cutter-supporting frame secured to said axle and adjacent to the idle supporting-wheel, a binding attachment suspended between the two said frames and having a table the upper end of which forms a primary receptacle for the cut and gathered stalks from which they are moved partly by gravity and partly through the instrumentality of the packing mechanism to the secondary or binding receptacle, substantially as described.

11. In a corn cutter and binder in combination with the carrying-wheels and a bent axle of a main gearing-frame supported upon said axle and adjacent to the driving-wheel, a cutter-supporting frame secured to said axle and adjacent to the idle supporting-wheel, the gathering apparatus situated above the said cutter-frame the stubble side of which is supported by outreaching arms from the said main gearing-frame and the uncut-corn side of which is supported by an upreaching arm from the said cutter-frame, a binding attachment suspended between the two said frames and having a table the upper end of which forms a primary receptacle for the cut and gathered stalks, down which they are moved partly by gravity and partly through the instrumentality of the packing mechanism to the secondary binding-receptacle, guides extending beyond the said gathering mechanism to direct the fall of the said stalks onto the primary receiving portion of the binding-table substantially as described.

12. In a corn cutter and binder in combination with the carrying-wheels and a bent axle of a main gearing-frame supported upon said axle and adjacent to the driving-wheel, a cutter-supporting frame secured to said axle and adjacent to the idle supporting-wheel, the gathering apparatus situated above the said cutter-frame the stubble side of which is supported by outreaching arms from the said main gearing-frame and the uncut-corn side of which is supported by an upreaching arm from the said cutter-frame, a binding attachment suspended between the two said frames and having a table, the upper end of which forms a primary receptacle for the cut and gathered stalks, down which they are moved partly by gravity and partly through the instrumentality of the packing mechanism to the secondary binding-receptacle, guides extending beyond the said gathering mechanism to direct the fall of the said stalks onto the primary receiving portion of the binding-table, the idle supporting-wheel adjustably secured to the axle whereby the gathering and cutting end of the machine may be raised or lowered at will, substantially as described.

13. The combination with the jointed gathering-boards of the universally-flexible gathering-chain, substantially as described.

14. The binder-driving device, consisting of the shaft $F^3$ suitably supported in bearings and having the eccentric portion $q$ and the angular nut $q^2$, the sprocket-wheel $Q'$ having an eye so constructed that the said sprocket-wheel shall turn upon said shaft $F^3$ and at the same time be permitted to rock relatively to the said shaft, all combined substantially as described.

15. The combination of an adjustable binding attachment placed diagonal relative to its driving-shaft, its driven shaft carrying a sprocket-wheel, the said driving-shaft having a sprocket-wheel mounted diagonally upon a support surrounding the said shaft and adapted to be driven by said shaft, a chain connecting said sprocket-wheels and a spring take-up for the said chain, substantially as described.

16. The diagonal sprocket-wheel $Q'$, the sliding shaft carrying the sprocket-wheel $Q^2$, the said shaft diagonal with the shaft carrying the said sprocket-wheel $Q'$ the sprocket-wheel guide S, the chain $Q^3$ and the spring take-up $S'$, all combined, substantially as described.

JOHN A. STONE.

Witnesses:
ARTHUR JOHNSON,
JOHN F. STEWARD.